United States Patent
Vesel et al.

(10) Patent No.: US 7,800,376 B2
(45) Date of Patent: Sep. 21, 2010

(54) METHOD AND DEVICE FOR MEASURING ULTRAHIGH VACUUM

(75) Inventors: Alenka Vesel, Trzin (SI); Miran Mozetic, Ljubljana (SI)

(73) Assignee: Institut "Jozef Stefan", Ljubljana (SI)

( * ) Notice: Subject to any disclaimer, the term of this patent is extended or adjusted under 35 U.S.C. 154(b) by 49 days.

(21) Appl. No.: 10/590,117

(22) PCT Filed: Jan. 26, 2005

(86) PCT No.: PCT/SI2005/000003
§ 371 (c)(1),
(2), (4) Date: Nov. 6, 2006

(87) PCT Pub. No.: WO2005/080932
PCT Pub. Date: Sep. 1, 2005

(65) Prior Publication Data
US 2007/0170926 A1    Jul. 26, 2007

(30) Foreign Application Priority Data
Feb. 23, 2004  (SI) .............................. P-200400060

(51) Int. Cl.
*G01L 21/30* (2006.01)
*G01L 21/34* (2006.01)
(52) U.S. Cl. ....................................... 324/460; 324/463
(58) Field of Classification Search .................. 324/460, 324/463
See application file for complete search history.

(56) References Cited

U.S. PATENT DOCUMENTS

| | | | |
|---|---|---|---|
| 3,051,868 A | | 8/1962 | Redhead |
| 3,872,377 A | * | 3/1975 | Kageyama et al. .......... 324/463 |
| 4,000,457 A | * | 12/1976 | O'Neal, III ................. 324/463 |
| 4,409,482 A | * | 10/1983 | Scheid et al. ............... 250/282 |

(Continued)

FOREIGN PATENT DOCUMENTS

GB    722788    1/1955

OTHER PUBLICATIONS

International Preliminary Report on Patentability issued on Aug. 29, 2006 in connection with PCT/SI2005/000003.

(Continued)

*Primary Examiner*—Jeff Natalini
(74) *Attorney, Agent, or Firm*—Smith Moore Leatherwood LLP

(57) ABSTRACT

A method and a device for measuring ultrahigh vacuum are disclosed. The method includes providing a vacuum cold cathode pressure gauge and varying a voltage on an anode of the pressure cell with pressure in such a way that an ion current flow is maintained substantially at its maximum value at all times. A voltage-controlled source either (1) preliminarily scans a whole voltage range, for example, between 1 kV and 12 kV, in a relatively short time, and subsequently sets the source to the voltage, at which the current is substantially at its maximum value or (2) based on a calibration of the gauge, sets the voltage, for a given pressure, to the value that has been previously stored as substantially optimal. The device operates at a voltage that varies with pressure in such a way that the ion current is maintained substantially at its maximum value at all times. The device is characterized in that an anode of the pressure gauge cell is connected to a voltage-controlled source capable of providing a varying voltage.

11 Claims, 4 Drawing Sheets

U.S. PATENT DOCUMENTS

| | | | |
|---|---|---|---|
| 4,866,640 A | | 9/1989 | Morrison, Jr. |
| 4,967,157 A | * | 10/1990 | Peacock .................... 324/460 |
| 5,198,772 A | | 3/1993 | Peacock et al. |
| 5,278,510 A | | 1/1994 | Baptist et al. |
| 5,568,053 A | | 10/1996 | Drubetsky et al. |
| 5,870,358 A | * | 2/1999 | Kim et al. ................ 369/30.85 |
| 6,701,789 B1 | * | 3/2004 | Denny ......................... 73/700 |
| 7,098,667 B2 | * | 8/2006 | Liu ............................ 324/460 |
| 2003/0042921 A1 | * | 3/2003 | Hollman .................... 324/754 |
| 2003/0059730 A1 | * | 3/2003 | Sigafus et al. ................ 431/18 |
| 2006/0012373 A1 | * | 1/2006 | Edelmann et al. ........... 324/460 |

OTHER PUBLICATIONS

International Search Report mailed on Jul. 26, 2005 in connection with PCT/SI2005/000003.

Written Opinion of the International Searching Authority mailed on Jul. 26, 2005 in connection with PCT/SI2005/000003.

* cited by examiner

METHOD AND DEVICE FOR MEASURING ULTRAHIGH VACUUM

This application is a national stage application under 35 U.S.C. 371 of international application No. PCT/SI2005/000003 filed Jan. 26, 2005, published Sep. 1, 2005 as WO 2005/080932 A1, and claiming priority to Slovenian Application No. P-200400060 filed Feb. 23, 2004, the disclosures of which are expressly incorporated herein by reference.

The invention relates to a method and a device for measuring ultrahigh vacuum and, more particularly, to a method for measuring ultrahigh vacuum with an ultrahigh-vacuum cold cathode pressure gauge, and to an ultrahigh-vacuum cold cathode pressure gauge. The pressure gauge of the invention operates at a voltage that varies with pressure in such a way that the ion current flow is maintained at its maximum value at all times. The maximum current is more stable and is directly proportional to the pressure. That is why, by measuring said current, information about the pressure is obtained. Owing to its linear characteristic, which is a consequence of the varying voltage, the cold cathode pressure gauge is more accurate in measuring pressure. Due to its operation at maximum level, in turn, it exhibits better sensitivity.

1. TECHNICAL PROBLEM

For measuring pressure in ultrahigh vacuum, ionization gauges are utilized, the operation thereof being based on the measurement of the ion current (I) on the cathode, said ion current depending upon pressure (p). The main problem with all prior art pressure gauges consists in that the dependency of current upon pressure is non-linear. The ionization of the molecules is brought about by collisions with electrons, whereby an electrical discharge is initiated in the gauge cell. This can be brought about in two manners. In the first case, the source of electrons is the thermal emission of electrons from a hot cathode. Such devices are known as hot cathode pressure gauges. In the second case—relating to the so-called cold cathode pressure gauges—the source of electrons is the secondary emission from the cathode, said secondary emission being initiated by bombarding said cathode with ions. Since there are very few such electrons, we entrap them in a trap made by a convenient combination of a transversal electric and magnetic field.

Besides being functionally related to the pressure, the ion current in a cold cathode pressure gauge also depends on the magnetic field and on the source voltage. The magnetic field is generally constant and can not be modified. Likewise, the source voltage of the gauges is always selected so as to be constant, although it could be regulated in order to compensate for the discharge variations, resulting from variations in pressure.

2. BACKGROUND ART

The development of the first cold cathode pressure gauge based on the Penning cell (U.S. Pat. No. 2,197,079) which could only operate up to pressures of around $10^{-6}$ mbar, and the resulting commercial use of pressure gauges, prompted several patents, which are briefly discussed hereinbelow.

A pressure gauge suitable for measuring pressures in the ultrahigh-vacuum range, which could measure pressures of up to $10^{-12}$ mbar, was obtained by providing the ions collector with a special protection, thereby reducing the influence of parasitic currents, which were a consequence of the intense electric field inside the cell (U.S. Pat. No. 3,051,868).

The problem of weak currents at very low pressures was overcome by employing an additional source of ions (U.S. Pat. No. 5,278,510). As a source of ions a micropoint cathode is used which is arranged outside of an anode grid, so that electrons can pass into the interior of the anode cylinder and assist the ionization of molecules. The ion current flow is thereby increased and, consequently, easier to measure.

By developing a pressure gauge operating with a constant voltage at low pressures, and with a periodically varying voltage at higher pressures, a wider operating range of pressure measurement was achieved (U.S. Pat. No. 4,000,457). A pressure gauge of this type can operate even at high pressures of up to $10^{-1}$ mbar.

Furthermore, a pressure gauge was devised having a magnetic field that varies in direction along the gauge cell's axis, thereby facilitating the ignition of the pressure gauge at low pressures, which likewise broadens the operating pressure range of the pressure gauge (U.S. Pat. No. 5,568,053).

To shorten the ignition time of the pressure gauge at low pressures, an additional UV light source was introduced, triggering an emission of photoelectrons which, in turn, help initiate the electrical discharge (U.S. Pat. No. 5,198,772).

In U.S. Pat. No. 4,866,640 a pressure gauge is disclosed which, in addition to measuring the ion current, also measures the concomitant gas temperature. Said pressure gauge includes a special microprocessor which temperature-compensates the pressure readout in view of separately stored calibration data.

Prior art cold cathode pressure gauges operate at a constant voltage, which is situated outside of the maximum. For this reason, the ion current is non-linear. Moreover, instabilities and discontinuities often occur, impeding measurement.

It is an object of this invention to provide a method and a device for measuring ultrahigh vacuum and, more particularly, to provide a method for measuring ultrahigh vacuum by means of an ultrahigh-vacuum cold cathode pressure gauge and, as a further object of the invention, to provide an ultrahigh-vacuum cold cathode pressure gauge, that avoids prior art disadvantages, exhibits a better sensitivity, and enables linear, stable and continuous measurement of pressure in the ultrahigh-vacuum range.

According to the present invention the object is achieved by a method and a device for measuring ultrahigh vacuum according to the independent patent claims.

3. DESCRIPTION OF THE INVENTIVE SOLUTION

The present invention comprises a method and a device for measuring ultrahigh vacuum and, more particularly, a method for measuring ultrahigh vacuum by means of an ultrahigh-vacuum cold cathode pressure gauge, and the related ultrahigh-vacuum cold cathode pressure gauge with varying voltage. The ion current depends on the source voltage and reaches its maximum value at a predetermined voltage. The position of said maximum depends on pressure. The cold cathode pressure gauge according to the invention operates in such a way that the source voltage varies according to pressure, keeping the ion current at its maximum level at all times. The maximum ion current is directly proportional to the pressure. Said maximum current is stable and presents no discontinuities or oscillations, making pressure readings both more accurate and simpler. In addition, the cold cathode pressure gauge of the invention has a greater sensitivity because it operates at the maximum value.

The invention shall hereinafter be described with reference to the sample embodiment in conjunction with the accompanying drawings, wherein.

Figure 1:
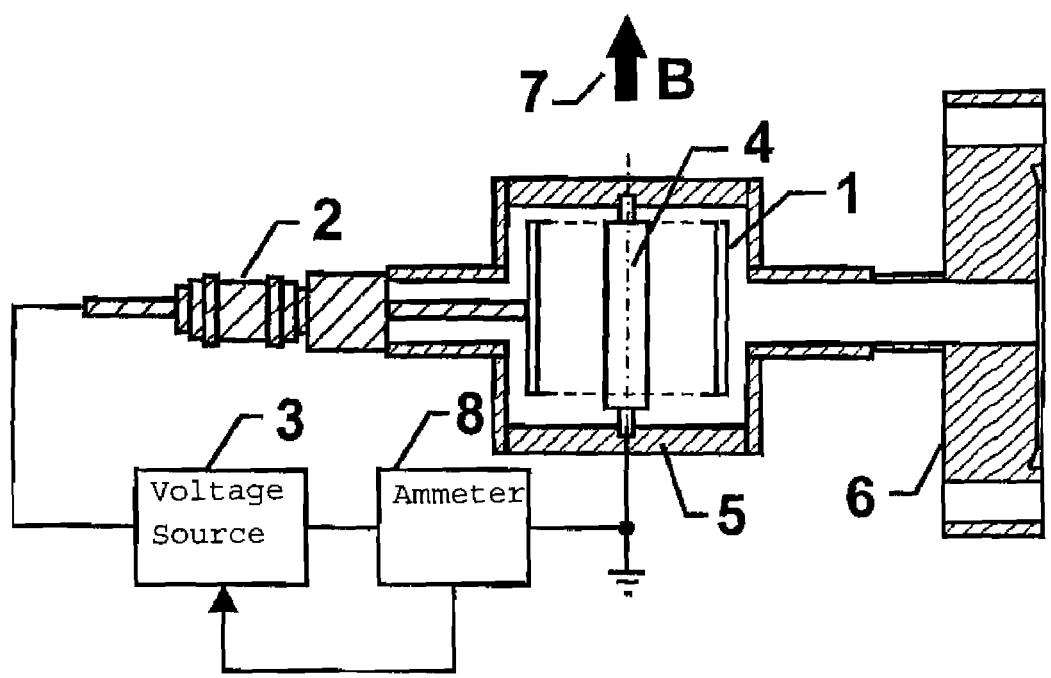
FIG. 1 is a schematic representation of the cold cathode pressure gauge in accordance with the invention.

FIG. 1 represents a pressure gauge in accordance with the invention, made of a magnetron cell. The magnetron cell is composed of two electrodes: the anode 1 in the form of a hollow anode cylinder, connected via a high-voltage conductor 2 to a voltage source 3, and the cathode 4 in the form of a cathode rod, disposed along the axis of and internal to the anode cylinder of the anode 1. The anode cylinder of the anode 1 and the cathode rod of the cathode 4, electrically insulated from one another, are enclosed in the housing envelope 5 of the pressure gauge, which is connected by means of a compact flange 6 to the vacuum system, wherein the pressure is to be established. By connecting the source voltage from a voltage-controlled source 3, a discharge is initiated in the anode cylinder of the anode 1 in the transversal electric field and the external magnetic field 7, oriented along both electrodes, namely, the anode cylinder of the anode 1 and the cathode rod of the cathode 4, in which discharge the ionization of gas molecules takes place, and the resulting ions are accelerated in the electric field within the cell toward the cathode 4. By means of the ammeter 8 the ion current on the cathode 4 is measured, which depends on pressure.

Figure 2:
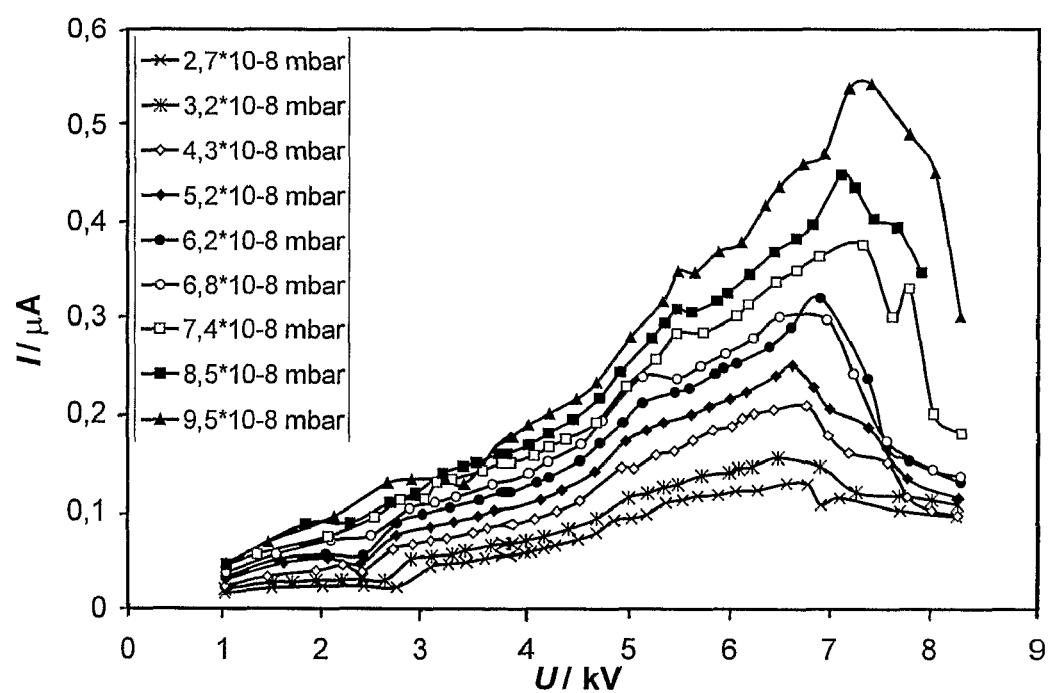
FIG. 2 shows the typical I(U) characteristic of the gauge at various pressures.
Figure 3:
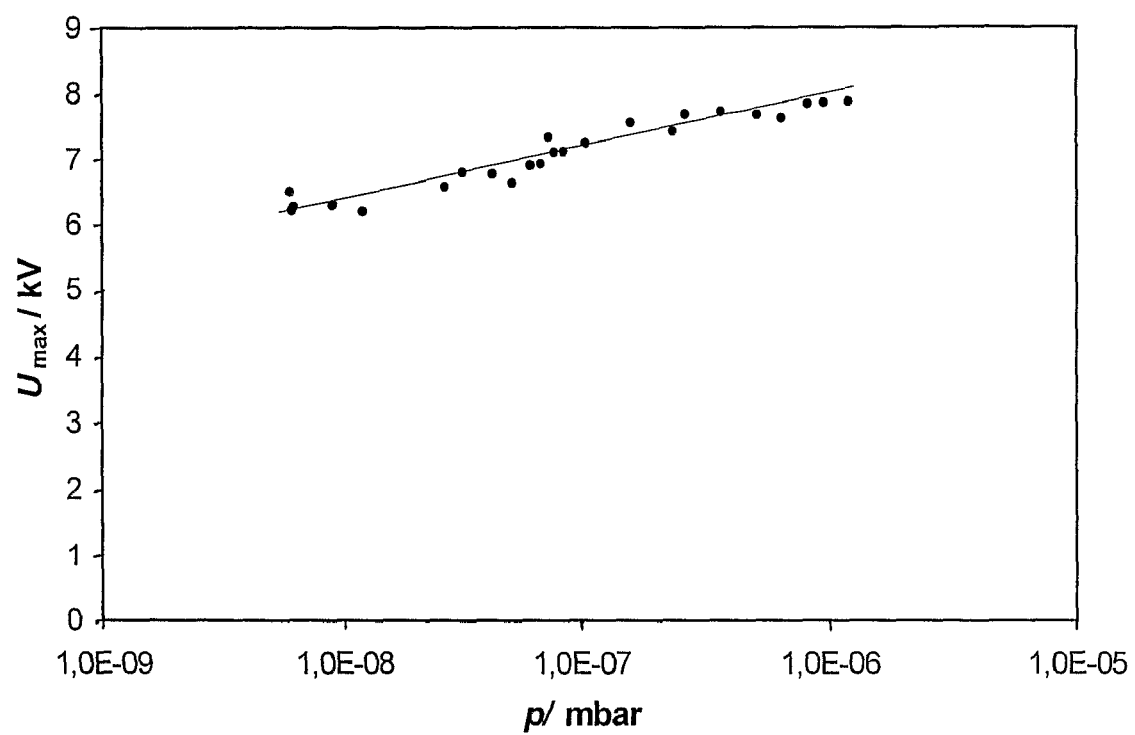
FIG. 3 shows a plot of the voltage, at which current is at its maximum value, against pressure.
Figure 4:
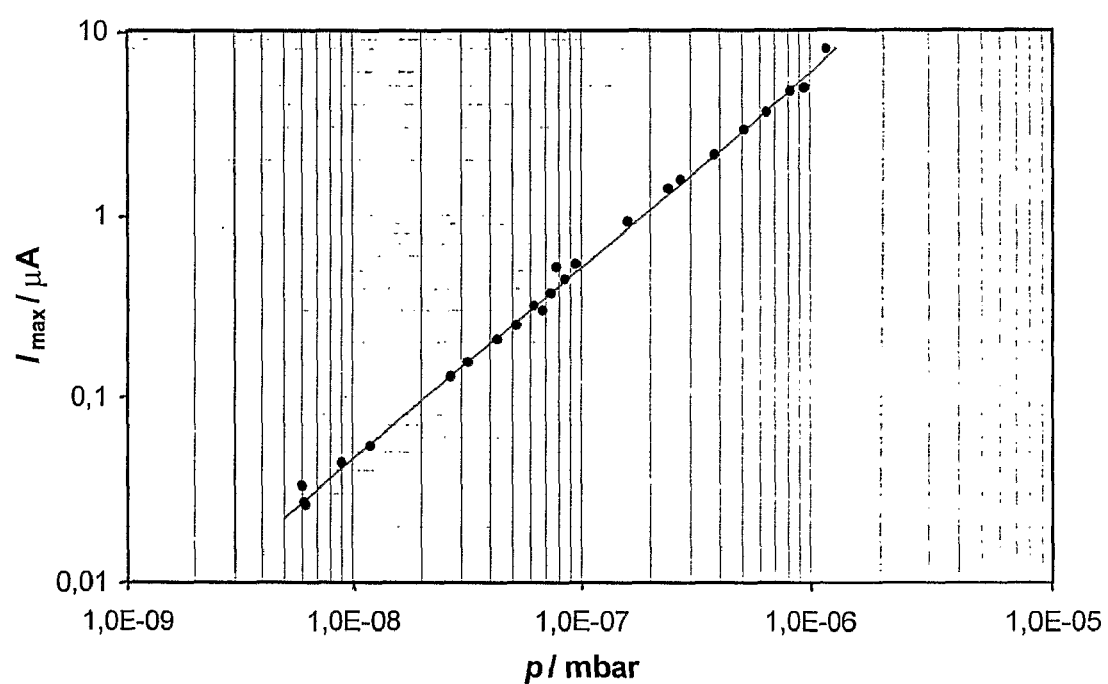
FIG. 4 shows a plot of the pressure dependence of the maximum ion current.

The source voltage of the pressure gauge must be selected carefully, in that the accuracy and sensitivity of said pressure gauge depend upon it. As may be seen in FIG. 2, the ion current first increases with voltage, then it reaches a very pronounced maximum value, and ultimately it drops. This characteristic dependence of current on voltage extends over the entire operating pressure range of vacuum gauges. The voltage-controlled source 3 ensures that the ion current of the pressure gauge is at its maximum value at all times. Now, this optimal voltage is not constant, but, in turn, varies with pressure, as shown in FIG. 3. The voltage increases roughly monotonously with increase in pressure. Which means that, at higher pressures, the pressure gauge must operate at a higher voltage. If the cold cathode pressure gauge operates in such a way that the current is maintained at its maximum value, said current is a function of the pressure, as shown in FIG. 4. Such manner of operation of the pressure gauge is accomplished through employing a voltage-controlled source 3, which may be done in two ways.

The first alternative is to provide the voltage supply—the voltage-controlled source 3—with a gauge, which preliminarily scans the whole voltage range (preferably between 1 kV and 12 kV) in a short time, and subsequently sets the source 3 to the voltage at which the current was at its maximum value. In this embodiment, therefore, the source 3 is connected to or includes a gauge and is controlled by said gauge so as to operate at a varying voltage.

The other alternative is to employ, based on the calibration of the gauge (in other words, the variation of voltage with pressure being known), a computerized voltage supply that, for a given pressure, will set the voltage to the value that has been previously stored as optimal. The pressure gauge of the invention may be used over the entire pressure range covered by cold cathode vacuum gauges of various types.

Likewise, the pressure gauge according to the invention may be utilized over the whole range of magnetic fields covered by cold cathode vacuum gauges of various types, the preferable range of magnetic field densities being comprised between 0.05 T and 1.5 T. Likewise, the inventive pressure gauge is applicable to other types of cold cathode gauges and to all electrode geometries, including the Penning pressure gauge with an absent cathode and the inverted magnetron gauge with the polarities of the electrodes inverted.

What is claimed is:

1. A method for measuring ultrahigh vacuum, the method comprising the steps of:
    (a) subjecting an ultrahigh-vacuum cold cathode pressure gauge to a magnetic field of between about 0.05 tesla (T) and about 1.5 tesla (T);
    (b) applying in a substantially linear manner increasing voltages of from between about 1 kV and 12 kV to an anode of the ultrahigh-vacuum cold cathode pressure gauge;
    (c) measuring anode currents corresponding to the applied voltages;
    (d) determining a maximum current and the corresponding applied voltage from the measured currents; and
    (e) setting the voltage applied to the anode to the corresponding applied voltage at which the current is substantially at its maximum.

2. The method according to claim 1, wherein the ultrahigh vacuum ranges from about $10^{-12}$ to about $10^{-6}$ millibar (mbar).

3. The method according to claim 1, wherein the ultrahigh vacuum ranges from about $10^{-8}$ to about $10^{-6}$ millibar (mbar).

4. The method according to claim 1, wherein the ultrahigh-vacuum cold cathode pressure gauge comprises a magnetron pressure gauge.

5. The method according to claim 1, wherein the ultrahigh-vacuum cold cathode pressure gauge comprises a Penning pressure gauge.

6. A device for measuring ultrahigh vacuum, the device comprising:
    (a) an ultrahigh-vacuum cold cathode pressure gauge comprising a magnetron pressure gauge, where said ultrahigh-vacuum cold cathode pressure gauge in the ultrahigh-vacuum cold cathode pressure gauge is configured to be subjected to a magnetic field of between about 0.05 tesla (T) and about 1.5 tesla (T);
    (b) a voltage-source in electrical communication with an anode of the ultrahigh-vacuum cold cathode pressure gauge;
    (c) a controller that controls the voltage-source so that a voltage applied to the anode comprises increasing voltages of between about 1 kV and about 12 kV applied in a substantially linear manner;
    (d) an ammeter that measures anode currents corresponding to the applied voltages;
    (e) a means for determining a maximum current and the corresponding applied voltage; and
    (f) a means for setting the applied voltage to the corresponding applied voltage at which the current is substantially at its maximum.

7. The device according to claim 6, wherein the ultrahigh vacuum ranges from about $10^{-12}$ to about $10^{-6}$ millibar (mbar).

8. The device according to claim 6, wherein the ultrahigh vacuum ranges from about $10^{-8}$ to about $10^{-6}$ millibar (mbar).

9. A device for measuring ultrahigh vacuum, the device comprising:

(a) an ultrahigh-vacuum cold cathode pressure gauge comprising a Penning pressure gauge, where said ultrahigh-vacuum cold cathode pressure gauge in the ultrahigh-vacuum cold cathode pressure gauge is configured to be subjected to a magnetic field of between about 0.05 tesla (T) and about 1.5 tesla (T);

(b) a voltage-source in electrical communication with an anode of the ultrahigh-vacuum cold cathode pressure gauge;

(c) a controller that controls the voltage-source so that a voltage applied to the anode comprises increasing voltages of between about 1 kV and about 12 kV applied in a substantially linear manner;

(d) an ammeter that measures anode currents corresponding to the applied voltages;

(e) a means for determining a maximum current and the corresponding applied voltage; and (f) a means for setting the applied voltage to the corresponding applied voltage at which the current is substantially at its maximum.

10. The device according to claim 9, wherein the ultrahigh vacuum ranges from about $10^{-12}$ to about $10^{-6}$ millibar (mbar).

11. The device according to claim 9, wherein the ultrahigh vacuum ranges from about $10^{-8}$ to about $10^{-6}$ millibar (mbar).

* * * * *

UNITED STATES PATENT AND TRADEMARK OFFICE
CERTIFICATE OF CORRECTION

PATENT NO. : 7,800,376 B2
APPLICATION NO. : 10/590117
DATED : September 21, 2010
INVENTOR(S) : Alenka Vesel and Miran Mozetic It is certified that error appears in the above-identified patent and that said Letters Patent is hereby corrected as shown below:

Column 4,
Line 31, "to about $10^{6}$ millibar (mbar)" should read -- to about $10^{-6}$ millibar (mbar) --.

Signed and Sealed this

Ninth Day of November, 2010

David J. Kappos
*Director of the United States Patent and Trademark Office*